United States Patent [19]
Penner et al.

[11] Patent Number: 5,339,069
[45] Date of Patent: Aug. 16, 1994

[54] BRAKE MONITORING SYSTEM

[75] Inventors: Wesley Penner, Burnaby; Gordon Penner; Robert Penner, both of Port Moody, all of Canada

[73] Assignee: Tripen Enterprises Ltd., Burnaby, Canada

[21] Appl. No.: 907,150

[22] Filed: Jul. 1, 1992

[51] Int. Cl.$^5$ .............................. B60Q 1/00
[52] U.S. Cl. ...................... 340/454; 340/453; 116/208; 188/1.11
[58] Field of Search ............. 340/453, 454, 671, 686; 116/208, 201–204, 283; 188/1.11; 73/709

[56] References Cited

U.S. PATENT DOCUMENTS

| | | | |
|---|---|---|---|
| 2,379,796 | 2/1945 | Freeman et al. | 188/196 |
| 2,522,903 | 9/1950 | Shively | 188/1.11 |
| 3,298,466 | 1/1967 | Ayers, Jr. et al. | 188/1.11 |
| 3,356,188 | 12/1967 | Goldman et al. | 188/79.5 |
| 3,673,563 | 6/1972 | Thielen et al. | 340/453 |
| 3,779,080 | 12/1973 | Smith | 73/396 |
| 4,279,214 | 7/1981 | Thorn | 73/709 |
| 4,642,603 | 2/1987 | Martinez, Jr. | 188/1.11 |
| 4,658,936 | 4/1987 | Moseley | 188/1.11 |
| 4,757,300 | 7/1988 | Sebalos | 188/1.11 |
| 4,776,438 | 10/1988 | Schandelmeier | 188/1.11 |
| 4,800,991 | 1/1989 | Miller | 188/1.11 |
| 4,879,964 | 11/1989 | Emerson, Jr. | 188/1.11 |
| 4,905,800 | 3/1990 | Mathews | 188/1.11 |
| 4,937,554 | 6/1990 | Herman | 340/453 |
| 4,964,679 | 10/1990 | Rath | 188/1.11 |
| 5,044,302 | 9/1991 | Goldfein et al. | 188/1.11 |
| 5,079,947 | 1/1992 | Feldman et al. | 340/453 |
| 5,189,391 | 2/1993 | Feldman et al. | 340/453 |

Primary Examiner—Donnie L. Crosland
Attorney, Agent, or Firm—Oyen Wiggs Green & Mutala

[57] ABSTRACT

The brake monitoring system of the present invention monitors and measures brake adjustment and brake lining wear in vehicles employing air brakes having an "S-Cam" assembly. The S-Cam is actuated by an pneumatically driven push-rod, which rotates a cam shaft on which the S-Cam is mounted by moving a slack adjuster lever mounted on an opposed end of the cam shaft. The S-Cam forces a pair of opposed brake shoes against the interior surface of a brake drum. Rotation of the S-Cam is measured with each application of the brakes and converted into a readout of the adjustment of the brake's adjustment and brake wear which is displayed in the vehicle cab.

7 Claims, 7 Drawing Sheets

BRAKE MONITORING SYSTEM

FIELD OF THE INVENTION

The present invention pertains to a device for monitoring and measuring brake lining wear and brake adjustment on trucks or other vehicles which employ an "S-Cam" assembly to provide braking.

BACKGROUND OF THE INVENTION

Conventional air-brakes used on trucks and the like typically comprise six basic elements; namely, a brake chamber assembly, a push-rod, a slack-adjuster lever, an S-Cam, brake shoes, and a brake drum.

A typical air brake assembly, has a pair of brake shoes mounted within a brake drum. The brake shoes are each pivotally mounted at one end (their lowermost ends in the examples given herein). An S-Cam, which is a rotatable cam shaft having an S-shaped pair of cam surfaces at one end is mounted with the cam surfaces between the brake shoes at their other ends (their uppermost ends in the examples given herein). Cam followers on the brake shoes bear against the cam surfaces on the S-Cam. When the S-Cam is rotated the cam followers follow the contour of the cam surfaces. When the S-Cam is rotated in a sense which tends to force the cam followers apart as they follow the contours of the cam surfaces, the brake shoes pivot outwardly to bring brake linings on the outer surfaces of the brake shoes into forceful contact with the interior surface of the brake drum.

The S-Cam in a typical brake assembly is rotated by applying force to the end of the slack adjuster lever which is a rigid arm extending perpendicularly from the S-Cam at its end away from the cam surfaces. Force is applied to the slack adjuster lever by the push-rod. One end of the push-rod is pivotally connected to the end of the slack adjuster lever and the other end of the push-rod is connected to a diaphragm inside the brake chamber assembly.

To apply the brakes, pressurized air is introduced into the brake chamber assembly. The pressurized air acts on the diaphragm which, in turn, pushes on the push-rod. The push-rod acts on the end of the slack adjuster lever to rotate the S-Cam. Rotation of the S-Cam causes the brake linings to frictionally engage the inside surface of the brake drum.

Air-brakes comprising such a S-Cam arrangement (hereinafter "S-Cam air brakes") can fail if the brake linings or drum become excessively worn, or if the brakes are not properly adjusted. To properly understand this invention it is necessary to keep separate the concepts of brake wear and brake adjustment.

Brake wear refers to the loss of material from the brake linings and brake drum by frictional abrasion of the brake linings and brake drum during repeated application of the brakes. If brake linings are not regularly replaced, they may abrade to the point where the metal surface of the brake shoe (to which the brake linings are mounted) is forced into engagement with the interior surface of the brake drum when the brakes are applied. When the brake linings are worn to this degree braking is effectively lost. It is therefore important to monitor the state of wear of the brake linings and to replace them before they become too thin. The thickness of the brake linings at a given time is an indication of the amount of brake wear. Occasionally, the brake drum must be replaced as the interior surface of the brake drum (the surface which the brake linings frictionally engage when the brakes are applied) eventually becomes worn.

As the brake linings and brake drum are abraded by repeated application of the brakes, the brake linings must be moved further apart before they engage the inner surface of the brake drum. Therefore, as the brakes wear, the S-Cam must be rotated through an increasingly large angle to force the cam followers on the brake shoes far enough apart to force the brake linings against the brake drum. The required angular rotation of the S-Cam becomes greater as brake wear progresses. This process accelerates as the brake linings become worn. As the brake linings wear down the rate of wear increases because the thin, worn down linings cannot absorb the heat generated by friction between the brake linings and brake drum when the brakes are applied as well as new linings can.

Wear of the brake linings and brake drums is normal and expected and does not cause problems if the brakes are inspected and adjusted frequently. Unfortunately, all too often, truck owners do not have the brakes on their trucks inspected either carefully enough or with sufficient regularity to avoid occasional brake failures.

As the brake linings wear, two situations can cause brake failure apart from the complete abrasion away of the brake linings. The less common occurrence is that the brake linings and brake drum wear to such a point that the cam surfaces on the S-Cam cannot force the brake shoes far enough apart to engage the remaining brake lining with the brake drum no matter how far the S-Cam is rotated. An attempt to do so creates so-called "cam-over". Cam-over occurs when the S-Cam is rotated past the point where the cam followers on the brake shoes are most widely separated. At this point the cam followers either break free of the cam surfaces on the S-Cam or become jammed against the ends of the cam surfaces as the cam surfaces are forced from a normally generally vertical orientation into a horizontally disposed orientation between the cam followers. Cam-over is a result of excessive wear of the brake lining or brake drum.

A more common occurrence is that the brakes fall out of adjustment. As described above, as the brake linings and brake drum wear, the S-Cam must be rotated through an increasingly large angle to bring the brake linings into contact with the inner surface of the brake drum. As this process continues, a point is reached where the brake linings cannot be forced against the brake drum with sufficient force to stop the vehicle even when the push-rod travels through its full useful range of motion. This is because the push-rod has a very limited range of motion. Typical brake chamber assemblies will drive the push-rod over a distance which is typically less than a few inches. The limited travel of the push-rod necessitates brake adjustment.

Because the brake chamber assembly can only move the push-rod a limited distance, an operator must continually check the brake adjustment to guard against brake failure. Brake manufacturers typically publish push-rod travel distance specifications so that operators may determine, by measuring the length of the push-rod travel when the brakes are engaged, when the brakes are out of adjustment. If the push-rod is approaching its travel limits when the brakes are engaged then the brakes must be adjusted. If the operator fails to adjust the brakes when the push-rod is approaching its travel limits then the push-rod may be unable to rotate the S-Cam far enough, within the push-rod travel limits, to engage the brake linings with the brake drum with enough force to stop the vehicle.

Adjusting the brakes involves rotating the S-Cam with respect to the slack adjuster lever with the brakes not applied to reduce the clearance between the brake linings and the brake drum (i.e. to force the brake shoes farther apart). This is accomplished by means of a slack adjusting mechanism which is typically built into the slack adjuster lever. When the brakes are properly adjusted, the push-rod, within its limited range of motion, can rotate the S-Cam enough to forcefully engage the brake linings with the brake drum when the brakes are applied and yet the brake linings are not in contact with the brake drum when the brakes are not applied.

A difficulty with brake adjustment is that there is no indication to an operator attempting to adjust the brakes whether the slack adjuster assembly is being adjusted in the correct direction, or whether the slack adjuster assembly is being in fact adjusted so as to move the brake linings away from the brake drum. Further, there is no indication to an operator whether a slack adjuster assembly is working even if the slack adjuster assembly is being adjusted in the correct direction.

Brake wear and brake adjustment are interrelated, each a component of the S-Cam air brake maintenance cycle. The cycle is thus:

(1) When new brake linings are installed, the S-Cam is returned to its unrotated position with respect to the slack adjuster lever by means of the slack adjuster assembly. Because the brake linings are new, and thus are relatively thick, the S-Cam only has to rotate a very small distance in order to engage the fresh brake lining surface with the interior of the brake drum.

(2) As the brakes are repeatedly applied and the brake linings (and drum) wear down, the push-rod has to travel further on each application of the brakes to push the brake shoes sufficiently far apart (by rotating the S-Cam) to forcefully engage the brake linings with the brake drum. Eventually, after a first series of brake applications, the brake linings wear sufficiently so that, the push-rod is near its travel limit when the brakes are fully applied.

(3) With the brakes off (i.e. with the push-rod at the beginning of its stroke), the brakes are adjusted by rotating the S-Cam relative to the slack adjuster lever by means of the slack adjuster assembly to force the brake shoes apart. This brings the brake linings into proximity with the interior surface of the brake drum within the manufacturer's specified clearance limits.

(4) Steps 2 and 3 of the cycle then repeat with the next series of brake applications until the push-rod once again approaches its travel limit when the brakes are applied. After repeated cycles, the brake linings must be replaced before they are either completely worn out or the S-Cam approaches cam-over.

Conventionally, to check brake lining wear, a mechanic must inspect the brake lining through an inspection hole in the brake backing plate.

To check brake adjustment the push-rod travel must be measured and compared against the manufacturers specifications. Such inspections must be carried out for each brake assembly. A standard tractor-trailer might have ten or more such assemblies. The operator is expected to frequently inspect all of the brake assembles, day and night, in any weather. To properly conduct the inspections, the operator must usually crawl underneath the truck. It is not surprising that quite often only a cursory inspection is conducted.

The problem of warning vehicle operator when the brakes are almost out of adjustment is recognized in the prior art. Prior art devices simplify the operator's task of measuring push-rod travel but nonetheless rely on the measurement or monitoring of the physical travel of the push-rod. Typically the push-rod has markings placed either on or near it so that an operator can quickly check the displacement of the push-rod with respect to the markings to determine brake adjustment. Prior art devices have also included switches which are tripped by the push-rod when the push-rod approaches its travel limits so as to warn the operator of impending brake failure.

U.S. Pat. No. 5,044,302, Goldfein et al., dated 3 Sep., 1991, discloses measuring push-rod travel as a means of measuring brake lining wear. U.S. Pat. No. 4,776,438, Schandelmeier, dated 11 Oct., 1988, and U.S. Pat. No. 4,757,300, Sebalos, dated 12 Jul., 1988, disclose measuring push-rod travel as a means of measuring brake adjustment. These examples of prior art do not mention or imply that brake wear and adjustment may be monitored by measuring the rotation of the S-Cam in accordance with the present invention.

Various other methods and devices, apart from the use of an inspection hole in the brake backing plate, are found in the prior art for allowing an operator to determine brake wear. One such device is found in U.S. Pat. No. 3,356,188, Goldman et al., which issued 5 Dec., 1967. Goldman et al. teaches using the rotational position of the S-Cam relative to the slack adjuster lever as an indication of the degree of wear of brake linings in S-Cam air brakes.

Goldman et al. provides a dial and an indicating plate. The dial attaches to the S-Cam shaft and the indicating plate attaches to the slack adjuster lever. When new brake linings are installed and the brakes are properly adjusted a central lip on the dial corresponds with a tang on the indicating plate. As the brakes wear and the slack adjuster is adjusted the dial rotates with respect to the indicating plate. When the brake linings are completely worn and the brakes are properly adjusted, the tang corresponds with one of two lips on the dial.

As described above, monitoring brake wear merely means that the remaining thickness of the brake linings is being monitored. Thus in the Goldman et al. device, the relative movement of the dial over the indexing plate on the slack adjuster lever is an indication of how much the S-Cam has been rotated in adjusting the slack adjuster from its fully backed off position (the position equated with new unworn brake linings) to the position where the brake shoes have the proper clearance from the brake drum so that the brake shoes will properly engage the brake drums when the brakes are actuated. The amount the S-Cam shaft has been rotated relative to the slack adjuster lever to achieve this position is indicated by the position of the dial over the indexed plate.

The Goldman et al. device cannot be used to determine brake adjustment. As explained above, brake adjustment depends upon the physical travel limits of the push-rod and, in particular whether, within the short push-rod stroke, the brake shoes are forced outwards into forceful frictional engagement with the brake drum so as to provide effective braking.

The Goldman et al. device will not properly indicate the two problems caused by a limited push-rod stroke. That is, first, if the slack adjuster assembly has not been recently adjusted then there is no way to tell whether, within the short push-rod stroke, the S-Cam rotates far enough to force what is left of the brake linings against the brake drum. If the push-rod reaches the end of its stroke before the brake linings are brought into frictional engagement with the brake drum, the brakes are out of adjustment and will not operate properly. Goldman et al. does not teach monitoring brake adjustment, merely brake wear through cumulative S-Cam rotation. Second, if the S-Cam has been rotated too far by repeated adjustment of the slack adjuster assembly, further rotation of the S-Cam caused by actuating the push-rod may cause cam-over. The Goldman et al. does not teach monitoring for impending cam-over because it monitors S-Cam rotation only relative to the slack adjuster lever and not relative to a fixed reference such as the vehicle frame. The Goldman et al. device merely provides indication of the degree of brake wear. Consequently, brakes incorporating the Goldman et al. device may be out of adjustment or approaching cam-over and an operator looking at the Goldman et al. device would not be properly warned of impending brake failure.

U.S. Pat. No. 4,937,554, Herman, dated 26 Jun., 1990 discloses an electronic brake monitoring system which displays the status of the brakes in the vehicle cab. A computer monitors fluid pressure in the vehicle brakes, and more particularly, in the brakes pressurized fluid chamber. Herman does not teach or suggest monitoring rotation of the S-Cam.

SUMMARY OF THE INVENTION

The present invention monitors and displays brake adjustment and brake wear, and may also be used to indicate whether a slack adjuster is functioning properly or whether a slack adjuster assembly has been rotated in the wrong direction. One variable namely, the rotation of the S-Cam relative to the vehicle frame or another fixed reference point is monitored. By measuring the discrete rotation of the S-Cam each time the brakes are applied and by tracking the cumulative rotation of the S-Cam, indicators of brake adjustment and brake wear may be calculated and displayed to the operator in a remote location such as the cab of the truck.

Accordingly, the present invention provides a device for monitoring the adjustment of a brake, said brake comprising: a cam; a push-rod to rotate said cam, said push-rod having a maximum travel distance; slack adjustment means to rotate said cam relative to said push-rod to compensate for brake wear; and a brake lining which is brought into forceful contact with a brake drum by rotation of said cam. The device comprises an angular measurement transducer connected to said cam to produce a first signal related to the rotation of said cam relative to a reference angle; signal transmission means to convey said first signal to a computing means, said computing means being adapted to derive from said first signal a first indicator related to the distance said push-rod travels when said push-rod is actuated, relative to said maximum travel distance; and display means connectible to said computing means for displaying a visual representation of said first indicator to an operator of said brake.

The device may also include an alarm to warn an operator of the brake when the brake is out of adjustment.

The present invention also provides a method for monitoring the adjustment of a brake comprising a rotatable cam to actuate the brake and a push member to rotate the cam, wherein the push-member has a limited maximum usable travel distance. The method comprises the steps of: generating a first signal related to the rotation of said cam relative to a reference angle; measuring said first signal and deriving therefrom a measure of the amount of rotation of said cam produced by actuation of said push-member; and displaying a visual representation of the relative magnitudes of said measure of the amount of rotation of said cam and a first stored value, said first stored value representing the amount of rotation of said cam produced by motion of said push-member through said maximum usable travel distance, on a display visible to an operator of said brake.

The method may also include the step of triggering an alarm signal to alert the operator of the brake whenever the ratio of said measure of the amount of rotation of said cam to said first stored value is greater than a first predetermined threshold value.

BRIEF DESCRIPTION OF THE DRAWINGS

An embodiment of the invention will now be described by way of example with reference to the following drawings in which.

DETAILED DESCRIPTION OF THE PREFERRED EMBODIMENT

Figure 1:
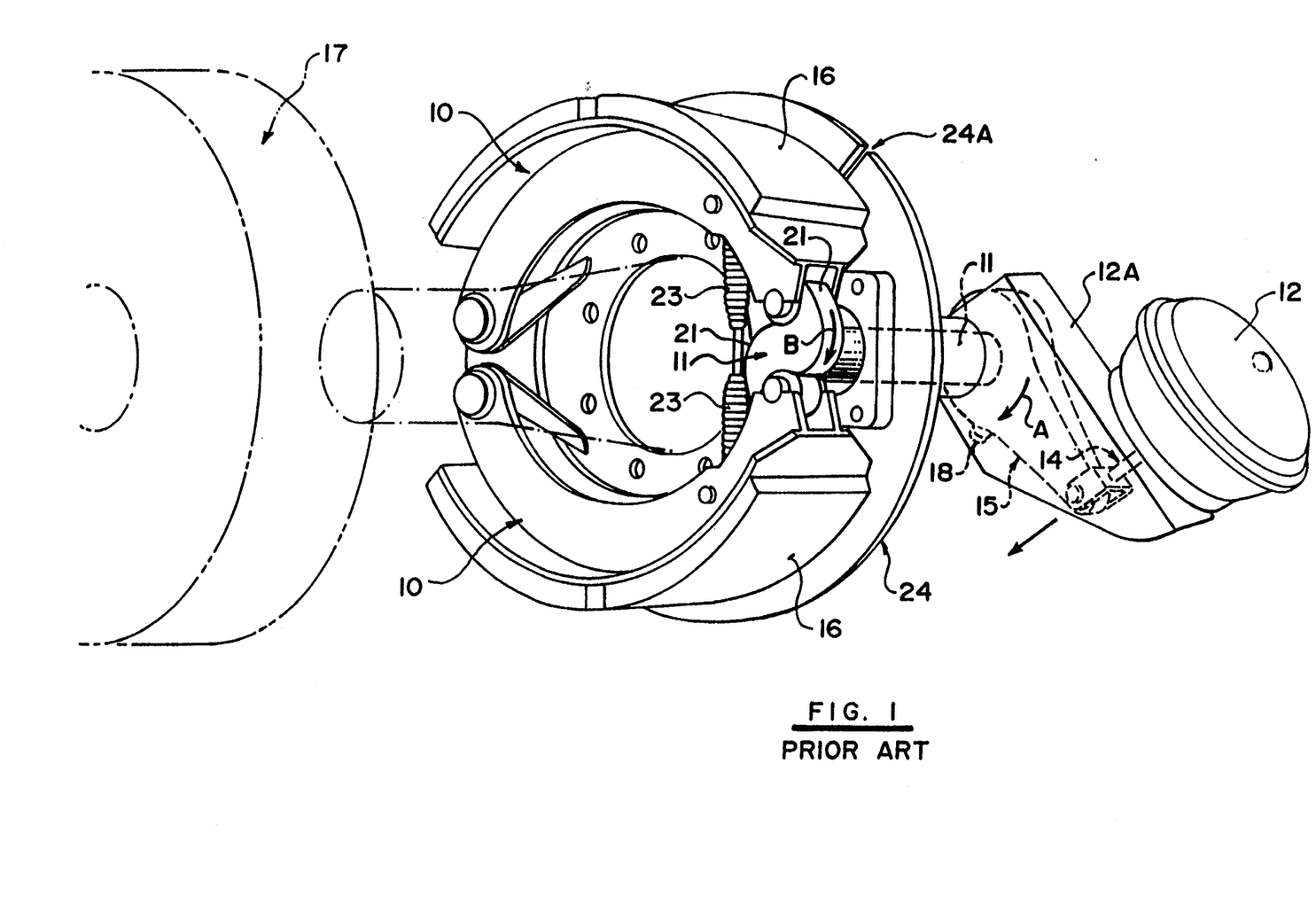
FIG. 1 is a partially exploded view of a prior art drum brake assembly.
Figure 2:
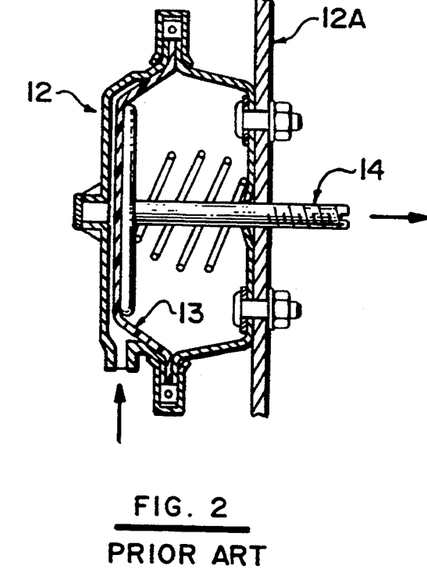
FIG. 2 is a section through a prior art brake chamber.
Figure 3:
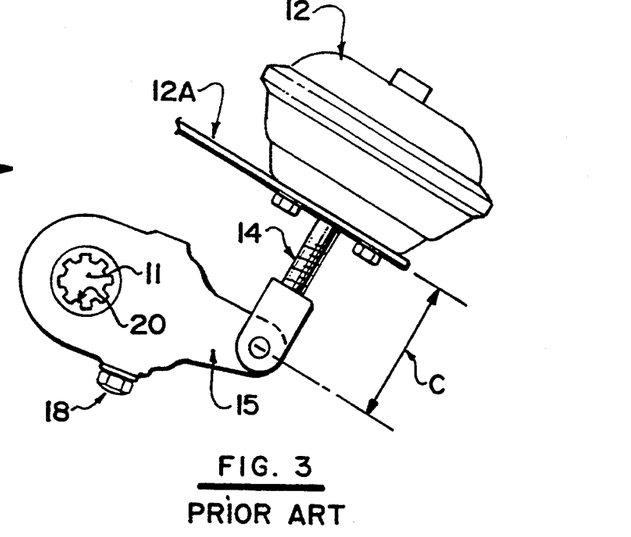
FIG. 3 is a side elevation of a prior art brake chamber and slack adjuster lever.

As illustrated in FIG. 1, in the prior art, brake shoes 10 are spread apart by rotation of S-Cam 11. When the brakes are applied, air enters brake chamber 12. Brake chamber 12 is mounted on mounting bracket 12a. As illustrated in FIG. 2, brake chamber 12 contains diaphragm 13 and push-rod 14 which converts the air pressure behind the diaphragm to a linear driving force. As illustrated in FIGS. 1 and 3, push-rod 14 extends from brake chamber 12 and is pivotally connected to slack adjuster lever 15. As illustrated in FIG. 1, slack adjuster lever 15 is rotated in direction "A" when pushed by push-rod 14 as push-rod 14 is forced from brake chamber 12 by diaphragm 13. Slack adjuster lever 15 engages splines 11a on S-Cam 11 (see FIG. 4) so that rotation of slack adjuster lever 15 rotates S-Cam 11 in direction "B". Rotating S-Cam 11 acts on cam followers 22 to force brake shoes 10 to spread apart to bring brake linings 16 into frictional engagement with the interior surface of brake drum 17 (as illustrated in FIG. 1).

Figures 4, 5:
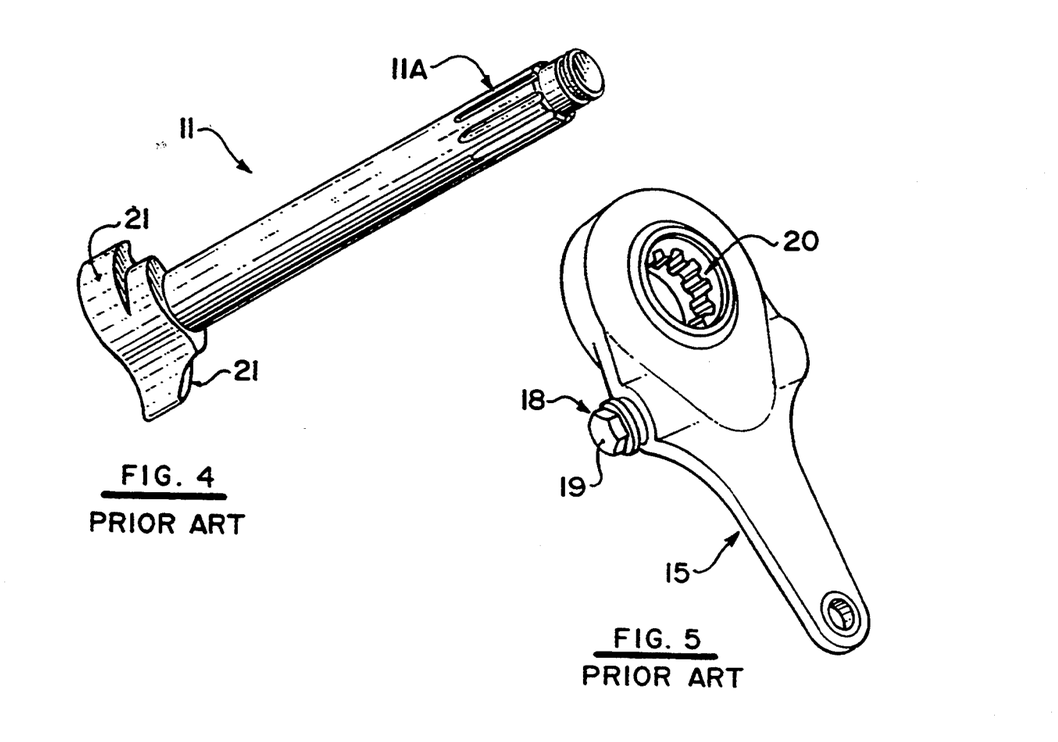
FIG. 4 is an isometric view of prior art S-Cam.
FIG. 5 is an isometric view of prior art slack adjuster lever.
Figure 6:
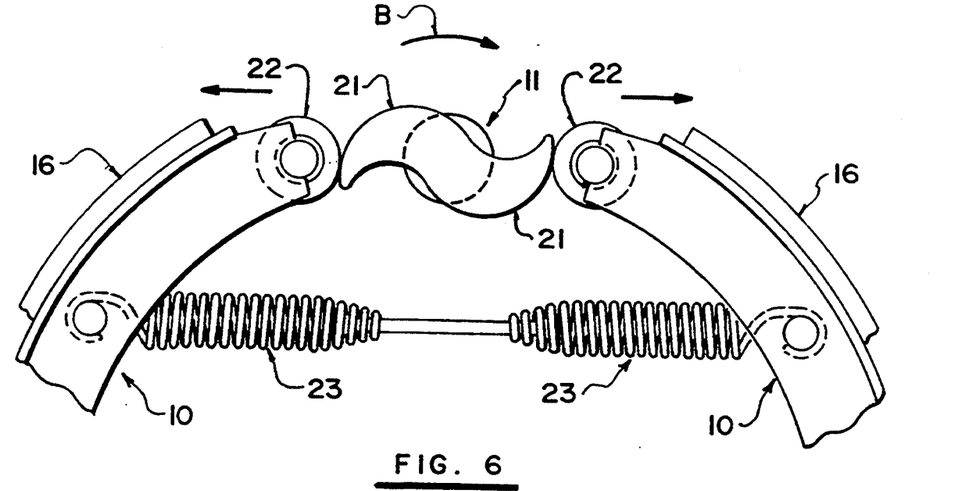
FIG. 6 is a side elevation showing an S-Cam engaged between the top portions of a pair of brake shoes.

As illustrated in FIGS. 1, 4 and 6, S-Cam 11 has S-shaped cam surfaces 21 on its end opposite splines 11a. Cam followers 22 on brake shoes 10 are urged against cam surfaces 21 by return biasing springs 23. Rotating S-Cam 11 in direction "B" forces cam followers 22 to follow divergent paths on cam surfaces 21, thereby forcing brakes shoes 10 apart. Rotating S-Cam 11, either by applying the brakes (causing push-rod 14 to rotate slack adjuster lever 15) or by adjusting slack adjuster assembly 18, relocates brake linings 16 closer to brake drum 17.

As brake linings 16 wear due to repeated application of the brakes, S-Cam 11 must rotate further to force brake linings 16 against brake drum 17. Slack adjuster assembly 18 on slack adjuster lever 15 must be adjusted to compensate for brake lining wear and for wear of the interior surface of the brake drum. As illustrated in FIG. 5, a typical slack adjuster lever 15 incorporates a slack adjuster assembly 18. Rotating slack adjuster nut 19 on slack adjuster assembly 18 rotates an internal worm gear (not shown), thereby rotating splined gear 20 relative to slack adjuster lever 15. A positive lock mechanism (not shown), consisting of a spring loaded lock sleeve which engages adjuster nut 19, prevents the adjustment of slack adjuster assembly 18 from changing after the adjustment has been completed. Splined gear 20 mates with splines 11a on S-Cam 11. Thus, rotating slack adjuster nut 19 rotates S-Cam 11 relative to slack adjuster lever 15.

The motion of push-rod 14 as it is forced from brake chamber 12 by diaphragm 13 results in changes in distance "C" (see FIG. 3). The distance that diaphragm 13 moves within brake chamber 12 translates directly into movement of push-rod 14. Thus, because diaphragm 13 is constrained to move within the confines of brake chamber 12, the limits of motion of push-rod 14 are constrained by the dimensions of brake chamber 12. Typically, the maximum usable push-rod travel (the change in distance "C" as push-rod 14 is moved from its fully retracted position to its fully extended position within its operating range) is about one and one-fifth (1 1/5) to two and one half (2½) inches. Travel of push-rod 14 through its maximum usable travel results in only a small rotation of slack adjuster lever 15 and S-Cam 11 in directions "A" and "B" respectively. If, before the brakes are applied, brake linings 16 are not in close proximity to the interior surface of brake drum 17 then the maximum push-rod travel will be insufficient to bring brake linings 16 into frictional engagement within brake drum 17. In this situation, the brakes are out of adjustment.

With the brakes not applied, rotating slack adjuster nut 19 on slack adjuster assembly 18 so as to rotate S-Cam 11 in direction "B" will, if brake linings 16 and brake drum 17 are not overly worn, bring the brakes back into adjustment by moving brake linings 16 back into close proximity with brake drum 17. This is the purpose of slack adjuster assembly 18. If, however, brake linings 16 and brake drum 17 are overly worn then at the point of maximum divergence of cam surfaces 21, brake linings 16 will still not be in close enough to brake drum 17 for frictional engagement to occur when the brakes are applied and push-rod 14 is forced to its maximum travel limits.

If slack adjuster assembly 18 is adjusted so that S-Cam 11 is, as illustrated in FIG. 6, rotated to its point of maximum divergence, further rotation of S-Cam 11 (either by further adjustment of slack adjuster assembly 18 or by application of the brakes) will cause "cam-over". Cam-over occurs when S-Cam 11 over-rotates resulting in cam followers 22 either jamming, so that biasing springs 23 cannot release the brake, or entirely releasing from their corresponding cam surfaces 21. Repeated adjustment of slack adjuster assembly 18 as the brake lining wears causes S-Cam 11 to rotate toward a critical cam-over position. Cam-over can occur when the brake lining or the brake drum is worn beyond the manufacturer's specified maximums for wear.

The braking force of the brakes is greatly reduced when the brakes are even slightly out of adjustment. It is the responsibility of the operator of the vehicle to ensure the brakes are adjusted correctly. This means that the operator must stop at every brake check point on the highway and crawl under the vehicle to inspect and, if necessary, adjust the brakes. The operator is also responsible for inspecting the adjustment of the brakes when he or she initially accepts the vehicle and, at regular intervals thereafter whether or not there are brake check points along the route taken.

Accidents are sometimes caused by slack adjuster assemblies being adjusted in the wrong direction by operators (i.e. in a direction causing S-Cam 11 to rotate in a direction opposite direction "B"), thereby moving the brake shoes away from the brake drum instead of towards it thereby rendering the brakes inoperative. There exist on the market self-adjusting slack adjusters for use with some models of brakes. These "self-adjusting" slack adjusters must still be checked to ensure that they have, in fact, automatically adjusted and have not become inoperative due to wear or clogging with dirt.

To check brake wear (i.e. the amount of brake lining left), a mechanic must crawl under the vehicle and remove a small inspection plug (not shown) from the inspection hole 24a in backing plate 24. A visual inspection of the brake wear may then be made through inspection hole 24a. Because brake wear is generally measured by a mechanic when the vehicle is being serviced and not by the operator of the vehicle the operator may be driving a vehicle with severely worn brakes and not know it. Sometimes, depending upon the conditions in which the brakes are used, the brake linings can wear so quickly that they can become completely worn out between regular inspection periods.

The present invention is a device for monitoring and measuring both brake lining wear and brake adjustment from inside the cab (or any other convenient place) of a vehicle equipped with S-Cam brakes.

As described above, slack adjuster lever 15 rotates S-Cam 11 when the brakes are applied. By monitoring the angular rotation of S-Cam 11 as the brakes are applied and released, the brake wear can be measured and monitored and the brake adjustment may be calculated. Brake wear and adjustment can then be meaningfully displayed to an operator of the vehicle.

Figure 9:
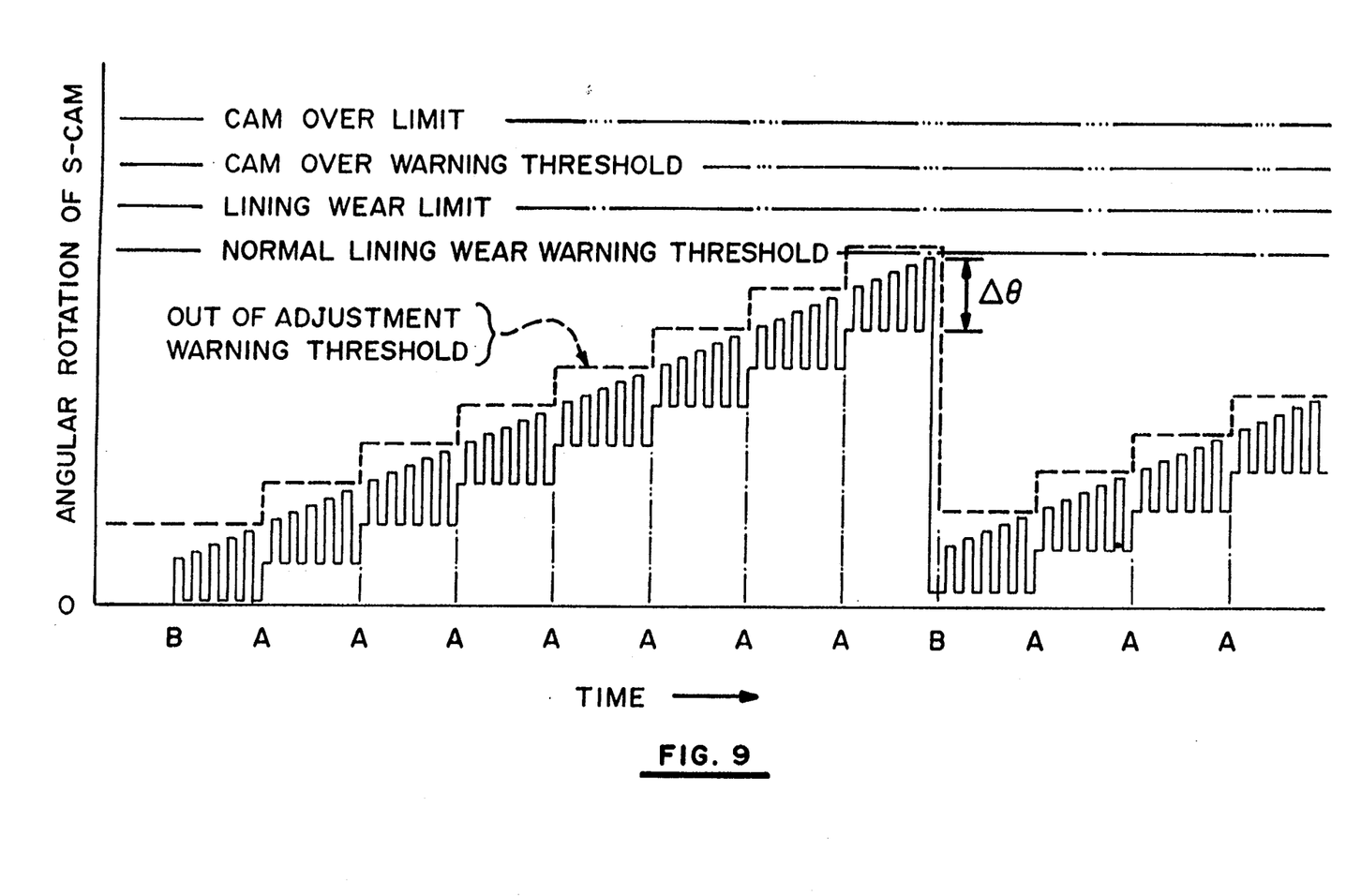
FIG. 9 is a graph of S-Cam angle versus time through an S-Cam air-brake maintenance cycle.

FIG. 9 is a plot showing the variation of S-Cam angle over time as the brakes are repeatedly applied. For the sake of simplicity the rate of brake wear has been greatly exaggerated in FIG. 9. In normal use it would take hundreds or thousands of brake applications to produce the degree of brake wear shown in FIG. 9 for a single application of the brakes.

In FIG. 9 zero degrees of S-Cam rotation has been arbitrarily chosen to be the angle of S-Cam 11 relative to the vehicle frame when the brake linings are new, the brake drum is unworn, and the brakes are properly adjusted. Each time the brakes are applied, S-Cam 11 rotates in direction B and when the brakes are released S-Cam 11 rotates back to its starting position in a direction opposite to direction B. Thus, each "pulse" in the graph of FIG. 9 corresponds to one application and release of the vehicle brakes.

Each time the brakes are applied, the brake linings and brake drum wear slightly so that the S-Cam must rotate further the next time the brakes are applied. In FIG. 9, this results in the pulses increasing in height for sequential brake applications.

The amount of rotation of S-Cam is related to the travel of push-rod 14. This is schematically illustrated in FIG. 10.

Figure 10:
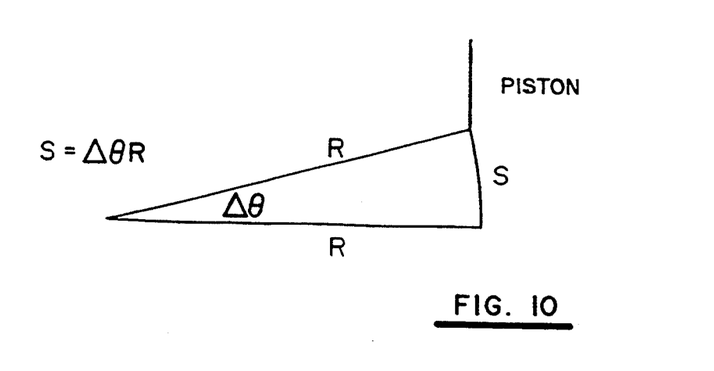
FIG. 10, which is located on the same sheet as FIGS. 6 and 7 is a diagram showing the geometrical relationship between piston travel and S-Cam angular rotation.

The S-Cam angular rotation, as shown in FIG. 10, can be used to calculate the push-rod stroke length using the following approximate formula:

$$S = \Delta\Theta \times R \qquad (1)$$

where:
R = length of slack adjuster lever 15
$\Delta\Theta$ = angle of rotation of S-Cam 15 (in radians)
S = stroke of push-rod 14

As the useful stroke of piston rod 14 is fairly small relative to the length of slack adjuster lever 15 and piston rod 14 generally begins its stroke approximately perpendicular to slack adjuster lever 15 this approximate equation is reasonably accurate. The exact formula relating the position of piston rod 14 to the angle of S-Cam 11 can readily be derived from the geometry of the brake assembly. The approximate equation of formula (1) has the advantages that it is simple and errs on the side of safety. That is, where the approximate formula gives a different result from the exact formula it slightly overestimates the travel of push-rod 14.

The adjustment of the brakes can be determined by measuring the height of the pulses (shown in FIG. 9). That is, by measuring the degree of rotation of S-Cam 11 when the brakes are applied. This corresponds to angle "$\Delta\Theta$" shown in FIG. 9. If the angle of S-Cam 11 is continuously monitored then $\Delta\Theta$ can be measured for each application of the brakes. A warning can be given to the operator when the push-rod travel (calculated from $\Delta\Theta$ according to Formula 1) approaches the maximum usable push-rod travel as specified by the brake manufacturer. The operator will then know that the brakes must be adjusted.

When the brakes are adjusted, the angle of S-Cam 11 relative to slack adjuster lever 15 is increased to compensate for brake wear. As described above, this new S-Cam position brings the distance between the brake lining and the brake drum to its properly adjusted minimum value without brake drag. In FIG. 9, the brakes were adjusted at the points labelled "A".

Brake lining wear can be monitored by measuring the absolute angular rotation of S-Cam 11 relative to the position S-Cam 11 was in, with the brakes released, when the brake linings were new and the brakes were properly adjusted. That is, the initial setting of the measuring device must be done with the slack adjuster fully backed off until the brake shoes are completely returned to their released position (as shown in FIG. 1). In this position the S-Cam is rotated a minimum angle relative to the slack adjuster lever. An alarm can be triggered when the angular rotation of S-Cam 11 when the brakes are applied indicates that the brake linings are nearly worn out. A further alarm can be triggered before the maximum angular rotation of S-Cam 11 is so great that cam-over becomes possible. Cam-over is a possibility even when the thickness of the brake linings is within the manufacturer's specifications if the brake drum is worn or cracked.

When the brake linings are replaced and the brakes are adjusted the rotation of S-Cam 11 returns to slightly above 0°. In FIG. 9, the brake linings have been replaced at the points labelled "B". The angle of S-Cam 11 may not return to exactly 0° when the brake linings are replaced due to wear of brake drum 17.

Figure 7:
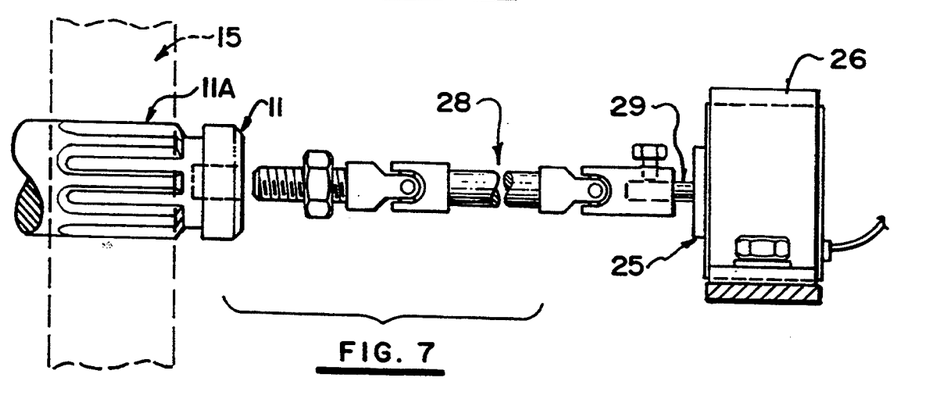
FIG. 7 is a side elevation of an angular displacement transducer about to be coupled to the cam of an air brake assembly.
Figure 8:
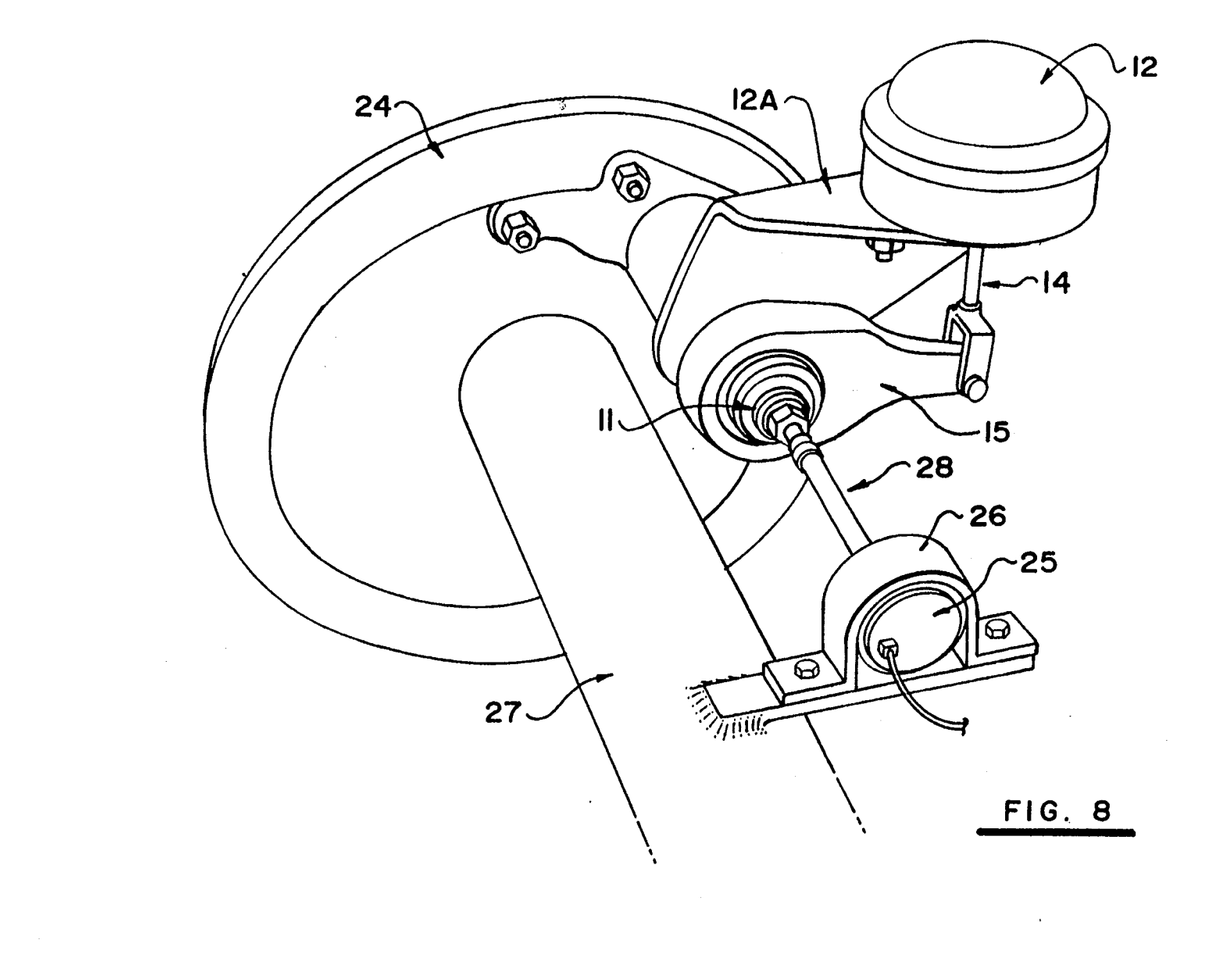
FIG. 8 is an isometric view of an angular displacement transducer coupled to an air brake assembly.

As illustrated in FIG. 7, the angle of S-Cam 11 is measured by an angular displacement transducer 25 which is attached to splined end 11a of S-Cam 11. Transducer housing 26 is anchored to axle 27. Transducer 25 is attached to splined end 11a of S-Cam 11 by means of a flexible shaft 28 threaded at one end into a hole drilled into the splined end 11a and rigidly attached at its opposite end to the transducer input shaft 29. Transducer 25 may be a RVIT-15-60 Rotary Position Sensor, available from Schaevitz Engineering of Pennsauken, N.J.

Figure 12:
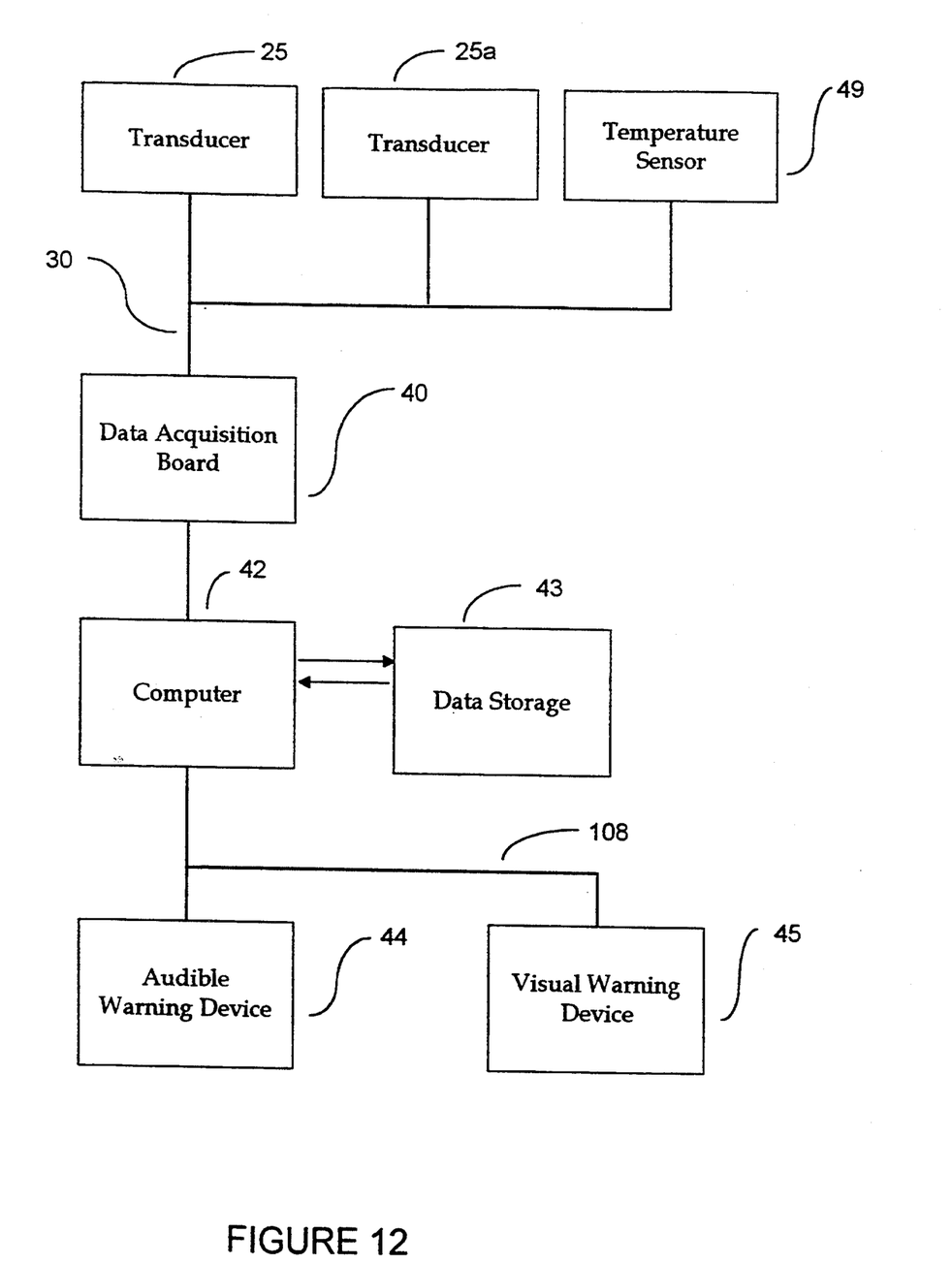
FIG. 12 is a block diagram of apparatus suitable for practising the method of the invention.

This transducer provides an analog electrical output proportional to the angle of transducer input shaft 29. Other types of transducer which may, for example, produce digital signals or, generally, any electrical, optical or mechanical signal related to the angle of S-Cam 11 also come with the scope of the invention. Signal 30, which is-output by transducer 25 is transmitted to an analog-to-digital data acquisition board 40, such as a PC-Labcard (TM) PCL-818, and the results are displayed on a readout after processing by a computer 42. A data storage means 43 is associated with computer 42.

The following description of a preferred embodiment of the invention assumes an Eaton (TM) brake system with a 30—30 spring brake air chamber, a manual slack adjuster assembly with a slack adjuster lever length of 5.5 inches (centre of hole to centre of hole), and a brake chamber push-rod stroke length of 1.50 inches.

Properly adjusted brakes will have a push-rod stroke of less than 0.5 inches before the brake linings engage the inside of the brake drums (if the brakes are adjusted for less than about 0.5 inches of piston travel then the brake linings will drag on the brake drum when the brakes are not engaged). Using the approximate formula (formula (1)), this translates to 0.0909 radians (5.21 degrees) of angular rotation of S-Cam 11. The amount of S-Cam rotational movement increases when the distance between the brake lining and brake drum increases due to brake lining wear, wear of the interior surface of the brake drum, or due to the brake drum cracking because of overheating. By measuring the total amount of rotation of the S-Cam during a brake application the computer program may apply either formula (1) or a more exact formula to provide an immediate, accurate and continuous indication of the brake adjustment which may be displayed in the form of a bar graph or like analog or digital readouts. By knowing the brake adjustment condition the operator of the vehicle is warned to adjust the brakes before they get out of adjustment.

Figure 11:
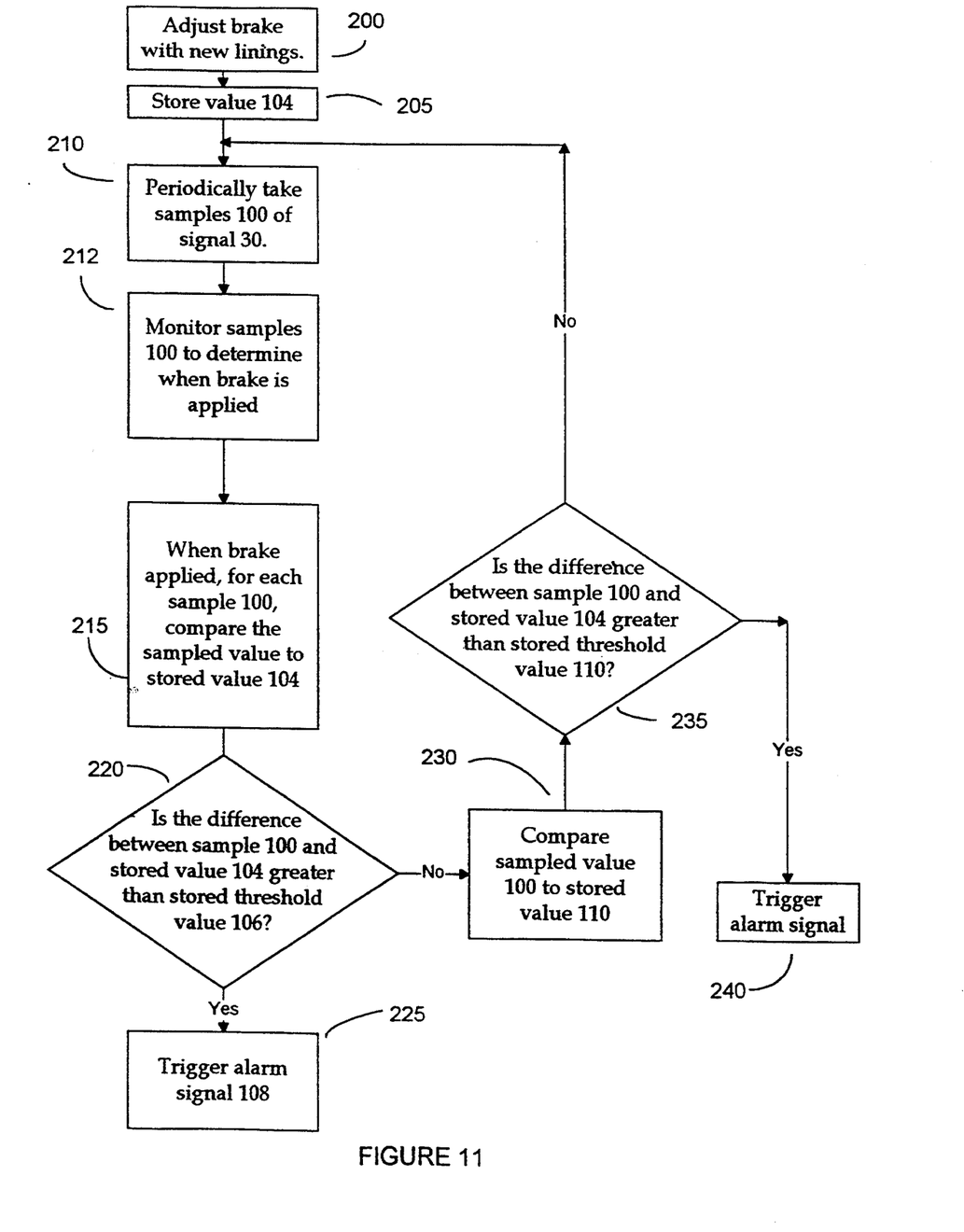
FIG. 11 is a block diagram illustrating the steps in a method for monitoring for excessive brake wear and approaching cam-over according to the invention.

As shown in FIG. 11 at 210, for each brake on the vehicle, the computer program continuously takes samples 100 of signal 30 which, as described above, varies with the angle of S-Cam 11. FIG. 11 shows two transducers 25 and 25a for measuring the angles of S-cams on two brakes of a vehicle. More transducers may be used on a vehicle which has more than two cam-operated brakes. The program calculates brake adjustment for each brake by comparing the difference between the angle of S-Cam 11 when the brake is applied and the angle of S-Cam 11 when the brake is not applied to a stored threshold value.

In step 215 and 220, the computer program calculates brake lining wear by comparing the difference between the angle of S-Cam 11 when the brakes are applied and a stored value 104 which represents the angle of S-Cam 11 when the brake linings were new and the brakes were properly adjusted to a stored threshold value 106. The steps of determining and storing value 104 are illustrated in FIG. 11 at 200 and 205.

As shown in FIG. 11 at 230 and 235, the computer program determines the approach of cam-over by comparing the angle of S-Cam 11 when the brakes are applied to a stored threshold value 110.

Where any of the above calculations produces a result greater than the threshold value the computer provides a visual and/or an audible warning to the operator by means of a visual warning device 44 and/or an audible warning device 45. For example, as shown at 225 in FIG. 11, if the difference between sample 100 and stored value 104 is greater than stored threshold value 106, an alarm signal 108 is triggered to warn the operator that brake lining 16 is worn. Similarly, as shown in FIG. 11 at 240, an alarm signal is triggered if the brake is approaching cam-over. Several thresholds may be stored for any of the above calculations. For example, the program may be designed to give warnings to the operator when a brake is 50%, 75%, 90% and 95% worn, thereby allowing the operator to plan maintenance well in advance.

The computer can determine whether a brake is or is not applied by monitoring the change in the angle of S-Cam 11 over time, as shown in FIG. 11 at 212. A warning can be triggered if not all of the vehicle's brakes are either applied or not applied at any given time.

The computer may monitor inputs from sources other than transducer 25. For example, brake temperature, as measured by a temperature sensor 49, or other vehicle conditions may be noted on the display together with or in the alternative to indicators of brake wear and adjustment.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for monitoring a brake for wear, said brake comprising a cam rotatable about an axis, actuator means coupled to said cam for turning said cam about said axis, a brake pad operatively associated with said cam and adjacent to an inner surface of a brake drum, said brake pad movable, by turning said cam about said axis through a cam angle, between a disengaged position wherein said brake pad is spaced apart from said inner surface of said brake drum and an engaged position wherein said brake pad is in forceable engagement with said inner surface of said brake drum, said method comprising the steps of:

(a) providing:
  i) a transducer coupled to said cam, said transducer adapted to provide a signal representative of said cam angle relative to a reference cam angle;
  ii) means for transmitting said signal from said transducer to an electronic computing means, said computing means for measuring said signal, comparing said measured signal to stored values, and generating an alarm signal when said measured signal has an unacceptable value; and,
  iv) warning means operatively associated with said computing means and responsive to said alarm signal for alerting an operator of said brake when said alarm signal is present;

(b) making a first measurement of said signal when said brake pad is new, said cam angle is a first angle and said brake pad is in a first position relative to said brake drum;

(c) storing a first value representative of said first measurement in said computing means;

(d) while said brake is being operated and said brake pad is in said engaged position, operating said computing means to:
  i) make a second measurement of said signal;
  ii) store a second value representative of said second measurement;
  iii) calculate a third value from a difference of said first and second values, said third value representative of a difference between said first angle and said cam angle when said second measurement was made;
  iv) compare said third value with a stored acceptable value to test whether said third value is acceptable or unacceptable; and
  v) trigger said alarm signal to activate said warning means if said third value is unacceptable.

2. The method of claim 1 wherein said step of making said second measurement comprises:
  (a) periodically sampling said signal over a time interval as said brake pad is moved from said disengaged position to said engaged position and back to said disengaged position; and
  (b) storing a maximum value of said signal during said time interval.

3. The method of claim 1 further comprising the step of displaying, on a display visible to an operator of said brake, a visual representation of the relative magnitudes of said third value and a stored value, said stored value representing a value of said third signal required to trigger said alarm signal.

4. The method of claim 3 wherein said step of making said second measurement of said signal comprises: sampling said signal during an interval as said brake pad is moved from said disengaged position to said engaged position and back to said disengaged position; and storing a maximum value of said signal during said interval.

5. The method of claim 1 wherein said stored acceptable value represents the value said third value would have when said brake was applied if said brake lining were worn and required replacement.

6. The method of claim 1 wherein said stored acceptable value represents the value said third value would have when said brake was applied if said cam were approaching cam-over.

7. The method of claim 1 further comprising
(a) providing a second angular measurement transducer connected to a second cam on a second brake to produce a second signal related to the rotation of said second cam relative to a second reference angle; and signal transmission means to convey said second signal to said computing means;
(b) monitoring said first signal and said second signal;
(c) determining from said first signal when said brake is applied;
(d) determining from said second signal when said second brake is applied;
(e) triggering an alarm whenever said brake is applied but said second brake is not applied; and,
(f) triggering an alarm whenever said second brake is applied but said brake is not applied.

* * * * *